(12) United States Patent
Pan et al.

(10) Patent No.: US 8,150,834 B2
(45) Date of Patent: Apr. 3, 2012

(54) ASSISTING METHOD AND APPARATUS FOR ACCESSING MARKUP LANGUAGE DOCUMENT

(75) Inventors: Sheng-Wen Pan, Taipei County (TW); Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 295 days.

(21) Appl. No.: 12/510,265

(22) Filed: Jul. 28, 2009

(65) Prior Publication Data

US 2010/0281076 A1    Nov. 4, 2010

(30) Foreign Application Priority Data

May 4, 2009  (TW) .............................. 98114706 A (51) Int. Cl.
G06F 17/30 (2006.01)
(52) U.S. Cl. ......... 707/713; 707/715; 707/716; 707/756
(58) Field of Classification Search .................. 707/705, 707/715–716, 756, 713
See application file for complete search history.

(56) References Cited

U.S. PATENT DOCUMENTS

| | | | |
|---|---|---|---|
| 6,636,845 B2 * | 10/2003 | Chau et al. ........................... | 1/1 |
| 7,133,857 B1 | 11/2006 | Zhang et al. | |
| 2004/0193607 A1 * | 9/2004 | Kudo et al. ........................ | 707/9 |
| 2005/0022115 A1 * | 1/2005 | Baumgartner et al. ........ | 715/513 |
| 2005/0055355 A1 * | 3/2005 | Murthy et al. ................. | 707/100 |
| 2007/0192251 A1 * | 8/2007 | Lowrance et al. ............... | 705/50 |
| 2008/0120321 A1 * | 5/2008 | Liu et al. ........................ | 707/102 |
| 2008/0120322 A1 * | 5/2008 | Liu et al. ........................ | 707/102 |
| 2008/0134020 A1 * | 6/2008 | Adeeb ........................... | 715/239 |
| 2008/0140645 A1 * | 6/2008 | Denoual ........................... | 707/5 |
| 2008/0288832 A1 * | 11/2008 | Hoshizawa et al. ........... | 714/701 |
| 2010/0011010 A1 * | 1/2010 | Murthy et al. ................. | 707/100 |
| 2010/0185683 A1 * | 7/2010 | Baby et al. .................... | 707/803 |

* cited by examiner

*Primary Examiner* — Hanh Thai
(74) *Attorney, Agent, or Firm* — Jianq Chyun IP Office (57) ABSTRACT

An assisting method and an assisting apparatus for accessing a markup language document are provided. First, an intermediate table is established in a storage unit, wherein the intermediate table includes a length field, a depth field, a type field, a parent element field, and an offset field. Then, structure data of each element in the markup language document is transformed into the intermediate table to respectively record a string length, a hierarchy depth, an element type, a parent element index, and an absolute position of the element into the length field, the depth field, the type field, the parent element field, and the offset field. Finally, access to the markup language document is assisted according to the intermediary table.

16 Claims, 5 Drawing Sheets

Establish an intermediate table in a storage unit, wherein the intermediate table includes a length field, a depth field, a type field, a parent element field, and an offset field — S105

Transform structure data of each element into the intermediate table to respectively store a string length, a hierarchy depth, an element type, a parent element index, and an absolute location of the element into the corresponding fields — S110

Assist access to a markup language document according to the intermediate table — S115

```
<?xml version="1.0" encoding="UTF-8" ?>
<store>
    <book author="Michael">
        <title>
            Advanced cocoa programming
        </title>
        <introduction>
            This book is for experienced programmers of cocoa framework.
        </introduction>
    </book>
    <book author="Michael">
        <title>
            iPhone programming
        </title>
        <introduction>
            For cocoa programmers who is interesting in iPhone native application.
        </introduction>
    </book>
</store>
```

```
<test>
    <title>
        ┌─────────────────────┐
        │   <encrypted>       │
        │   323xjajs;dfiasdf  │
        │   </encrypted>      │
        └─────────────────────┘
    <title>
<test>
```

FIG. 4A

```
<customer>
        ┌─────────────────────┐
        │   <signature>       │
        │   12xesjwje445jks   │
        │   </customer>       │
        └─────────────────────┘
</customer>
```

FIG. 4B

```
<name>
    Michael
</name>
```

FIG. 4C

| | | | | | |
|---|---|---|---|---|---|
| | | | | | |
| encrypted | | | | | |
| | | | | | |
| | | | | | |
| 00000 | | | 3 | | |
| | | | | | |
| signature | | | | | |
| | | | | | |
| | | | | | |
| 00000 | | | 8 | | |
| name | | | | | |
| | | | | | |
| | | | | | |
| /name | | | | | |

510 (row with 00000 and 3)
520 (row with 00000 and 8)
500

ASSISTING METHOD AND APPARATUS FOR ACCESSING MARKUP LANGUAGE DOCUMENT

CROSS-REFERENCE TO RELATED APPLICATION

This application claims the priority benefit of Taiwan application serial no. 98114706, filed on May 4, 2009. The entirety of the above-mentioned patent application is hereby incorporated by reference herein and made a part of this specification.

BACKGROUND OF THE INVENTION

1. Field of the Invention

The present invention generally relates to a method for accessing a markup language document, and more particularly, to an assisting method and an assisting apparatus for accessing a markup language document.

2. Description of Related Art

A markup language is a set of markup elements that describes how a text and information related to the text are structured, laid out, or formatted. Along with the development of the Internet, the HyperText Markup Language (HTML) and the Extensible Markup Language (XML) have become the most commonly used markup languages.

Because XML is very powerful, precise, and easy to write and extend (which allows a user to define tags), in recent years, XML documents have been broadly used in computer application programs or network application programs. In the future, XML documents will be broadly applied to the Internet and database management. Thereby, how to access a XML document efficiently is one of today's most focused subjects.

SUMMARY OF THE INVENTION

Accordingly, the present invention is directed to an assisting apparatus for accessing a markup language document, wherein the markup language document is transformed into an intermediate table.

The present invention is directed to an assisting method for accessing a markup language document, wherein access to the markup language document is assisted according to an intermediate table so that the efficiency of accessing the markup language document is increased.

The present invention provides an assisting method for accessing a markup language document, wherein the markup language document contains a plurality of elements. First, an intermediate table is established in a storage unit, wherein the intermediate table includes a length field, a depth field, a type field, a parent element field, and an offset field. Then, structure data of each of the elements is transformed into the intermediate table to respectively store a string length, a hierarchy depth, an element type, a parent element index, and an absolute position of the element into the length field, the depth field, the type field, the parent element field, and the offset field. The value of the offset field maybe the absolute position in a memory device or a relative position from the absolute position of the first element in the intermediate table. Finally, access to the markup language document is assisted according to the intermediate table.

According to an embodiment of the present invention, the step of accessing the markup language document according to the intermediate table further includes following steps. First, a location path containing a plurality of items is provided. Then, the elements corresponding to all the items in the location path are sequentially queried from the item at the lowest level in the location path by using the parent element indexes of the elements in the intermediate table. To be specific, an element corresponding to the item at the lowest level in the location path is first queried in the markup language document. After that, the parent element of the element is queried according to the parent element index of the element in the intermediate table, and whether the parent element is corresponding to an item at a next level in the location path is determined, wherein if the parent element is corresponding to the item at the next level in the location path, the elements corresponding to the items in the location path are continuously queried in the markup language document according to the intermediate table until the element corresponding to the item at the top level in the location path is queried.

According to an embodiment of the present invention, the step of transforming the structure data of each element into the intermediate table includes determining the string length of the element to record the string length into the length field, determining the hierarchy depth of the element in the markup language document to record the hierarchy depth into the depth field, determining the element type of the element according to a type definition table to record the element type into the type field, determining the parent element of the element according to the hierarchical relationship between the elements to record the parent element index into the parent element field, and determining the absolute position of the element in the markup language document to record the absolute position into the offset field.

According to an embodiment of the present invention, the intermediate table further includes a hash field, and the step of transforming the structure data of each element into the intermediate table further includes calculating a hashed value of the element to record the hashed value into the hash field, wherein the hashed value of the element may be calculated by adding up word codes of the element to obtain a pre-hashed value and then transforming the pre-hashed value into the hashed value through a hash function.

According to an embodiment of the present invention, when one of the elements in the markup language document is a ciphered element, the ciphered element is deciphered to generate a deciphered element, and then an identification row is inserted into the intermediate table. In the intermediate table, the identification row is located right after the ciphered element. The identification row includes a special symbol field and a ciphered element index field, wherein the special symbol field indicates that the data recorded right after the identification row is the deciphered element, and the ciphered element index field records the position of the ciphered element in the intermediate table.

According to an embodiment of the present invention, in the step of transforming the structure data of each element into the intermediate table, the structure data is stored into the intermediate table as binary data.

The present invention further provides an assisting apparatus for accessing a markup language document. The assisting apparatus includes a capturing unit and a storage unit. The storage unit stores an intermediate table, wherein the intermediate table includes a length field, a depth field, a type field, a parent element field, and an offset field. The capturing unit captures a string length, a hierarchy depth, an element type, a parent element index, and an absolute position of each element in the markup language document and stores the string length, the hierarchy depth, the element type, the parent element index, and the absolute position respectively into the length field, the depth field, the type field, the parent element field, and the offset field. The assisting apparatus assists the access to the markup language document according to the intermediate table.

According to an embodiment of the present invention, the assisting apparatus further includes a query module, wherein the query module sequentially queries the elements corresponding to all the items in a location path from the item at the lowest level in the location path by using the parent element indexes of the elements in the intermediate table.

According to an embodiment of the present invention, the query module queries an element corresponding to the item at the lowest level in the location path in the markup language document, then queries the parent element of the element according to the parent element index in the intermediate table, and determines whether the parent element is corresponding to an item at a next level in the location path, wherein if the parent element is corresponding to the item at the next level in the location path, the query module continues to query the items in the location path by using the intermediate table until the item at the top level in the location path is queried.

According to an embodiment of the present invention, the capturing unit determines the string length of each element to record the string length into the length field, determines the hierarchy depth of each element in the markup language document to record the hierarchy depth into the depth field, determines the element type of each element according to a type definition table to record the element type into the type field, determines the parent element of each element according to the hierarchical relationship between the elements to record the parent element index into the parent element field, and determines the absolute position of each element in the markup language document to record the absolute position into the offset field.

According to an embodiment of the present invention, the intermediate table further includes a hash field, and the capturing unit further calculates a hashed value of each element to record the hashed value into the hash field. To be specific, the capturing unit adds up the word codes of each element to obtain a pre-hashed value and then transforms the pre-hashed value into the hashed value through a hash function.

According to an embodiment of the present invention, the assisting apparatus further includes a ciphered element processing module. When one of the elements in the markup language document is a ciphered element, the ciphered element processing module deciphers the ciphered element to generate a deciphered element and then inserts an identification row into the intermediate table, wherein the identification row includes a special symbol field and a ciphered element index field, the special symbol field indicates that data recorded right after the identification row is the deciphered element, and the ciphered element index field records the position of the ciphered element in the intermediate table.

As described above, in the present invention, the parent element of each element in a markup language document is stored in an intermediate table so that the hierarchical tree structure of the entire markup language document is completely stored in the intermediate table. In addition, a hashed value of each element is further stored into the intermediate table so that most unexpected elements can be filtered out and the efficiency of accessing the markup language document can be increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In recent years, documents in the Extensible Markup Language (XML) format have become available everywhere. Thus, how to access a XML document efficiently has become a very important issue. Accordingly, the present invention provides an assisting method and an assisting apparatus for accessing and analyzing a XML document. In the present invention, an original XML document is transformed into an intermediate table so as to increase the speed of accessing the XML document. Embodiments of the present invention will be described below with reference to accompanying drawings.

Figure 1:
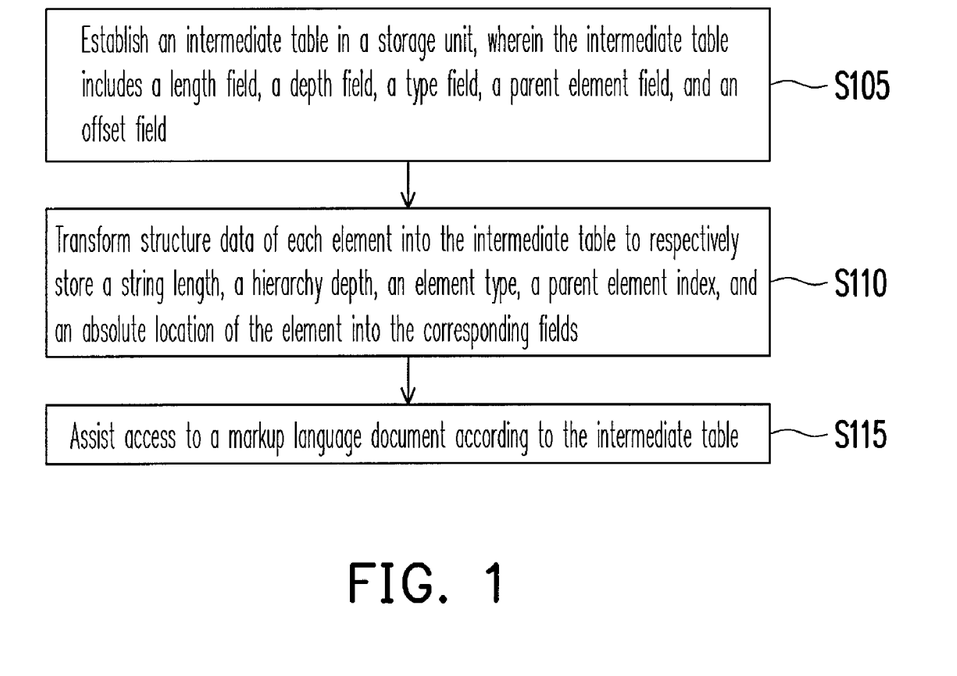
FIG. 1 is a flowchart of an assisting method for accessing a markup language document according to an embodiment of the present invention.

FIG. 1 is a flowchart of an assisting method for accessing a markup language document according to an embodiment of the present invention. Referring to FIG. 1, in the present embodiment, the markup language document is a XML document, and the markup language document contains a plurality of elements.

First, in step S105, an intermediate table is established in a storage unit. Then, in step S110, the structure data of the elements in the markup language document is transformed into the intermediate table, wherein the intermediate table includes a length field, a depth field, a type field, a parent element field, and an offset field for respectively storing a string length, a hierarchy depth, an element type, a parent element index, and an absolute position of each element. The intermediate table may further include a hash field for storing a hashed value of each element.

In the present embodiment, the intermediate table has a plurality of record rows, wherein each record row records the structure data of an element, and each record row includes a plurality of fields (for example, the length field, the depth field, the type field, the parent element field, and the offset field, etc) for storing the structure data of the element. The structure data of each element is stored into the intermediate table as binary data.

Figure 2:
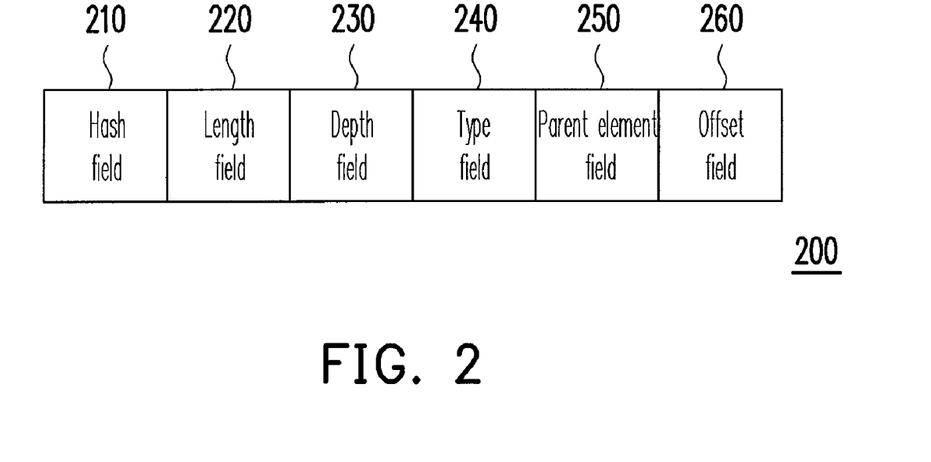
FIG. 2 is a diagram illustrating the fields in an intermediate table according to an embodiment of the present invention.

The intermediate table will be described below with reference to an embodiment of the present invention. FIG. 2 is a diagram illustrating the fields in an intermediate table according to an embodiment of the present invention. Referring to FIG. 2, in the present embodiment, the intermediate table 200 includes a hash field 210, a length field 220, a depth field 230, a type field 240, a parent element field 250, and an offset field 260. In another embodiment of the present invention, the intermediate table 200 may also include only the length field 220, the depth field 230, the type field 240, the parent element field 250, and the offset field 260.

The hash field 210 stores a hashed value of each element. For example, a pre-hashed value is first obtained by adding up the word codes of each element, and then the pre-hashed value is transformed into the hashed value through a hash function.

The length field 220 stores a string length of each element. For example, the string length of an element is determined and then stored into the length field 220. Besides, because the elements in the markup language document have a hierarchical relationship, after the hierarchy depth of an element in the markup language document is determined, the hierarchy depth is stored into the depth field 230.

The type field 240 stores the element type of each element, wherein the element type includes an element name, an attribute name, an attribute value, and a content, etc. In addition, the element type may further include a start tag, an end tag, and a comment according to the actual application. A type definition table may be established in advance, wherein a number is assigned to each element type (for example, a type number 1 is assigned to element name, and a type number 2 is assigned to attribute name, etc), so that the element type of an element can be determined according to the type definition table and recorded into the type field 240.

The parent element field 250 stores the parent element index of each element. For example, assuming that the index of an element A is 1 and the element A is the parent element of an element B, when the parent element of the element B is determined to be the element A, the parent element index of the element B is determined to be 1, and 1 is recorded into the parent element field 250.

The offset field 260 stores the absolute position of each element in the markup language document. The position of an element may be determined by counting from the first word in the markup language document. When the string of a specific element is to be queried, the start position of the specific element in the markup language document is determined according to the offset field 260. In addition, the end position of the string can be obtained through the length field 220. Accordingly, the string of the specific element can be obtained according to the offset field 260 and the length field 220.

Figure 3:
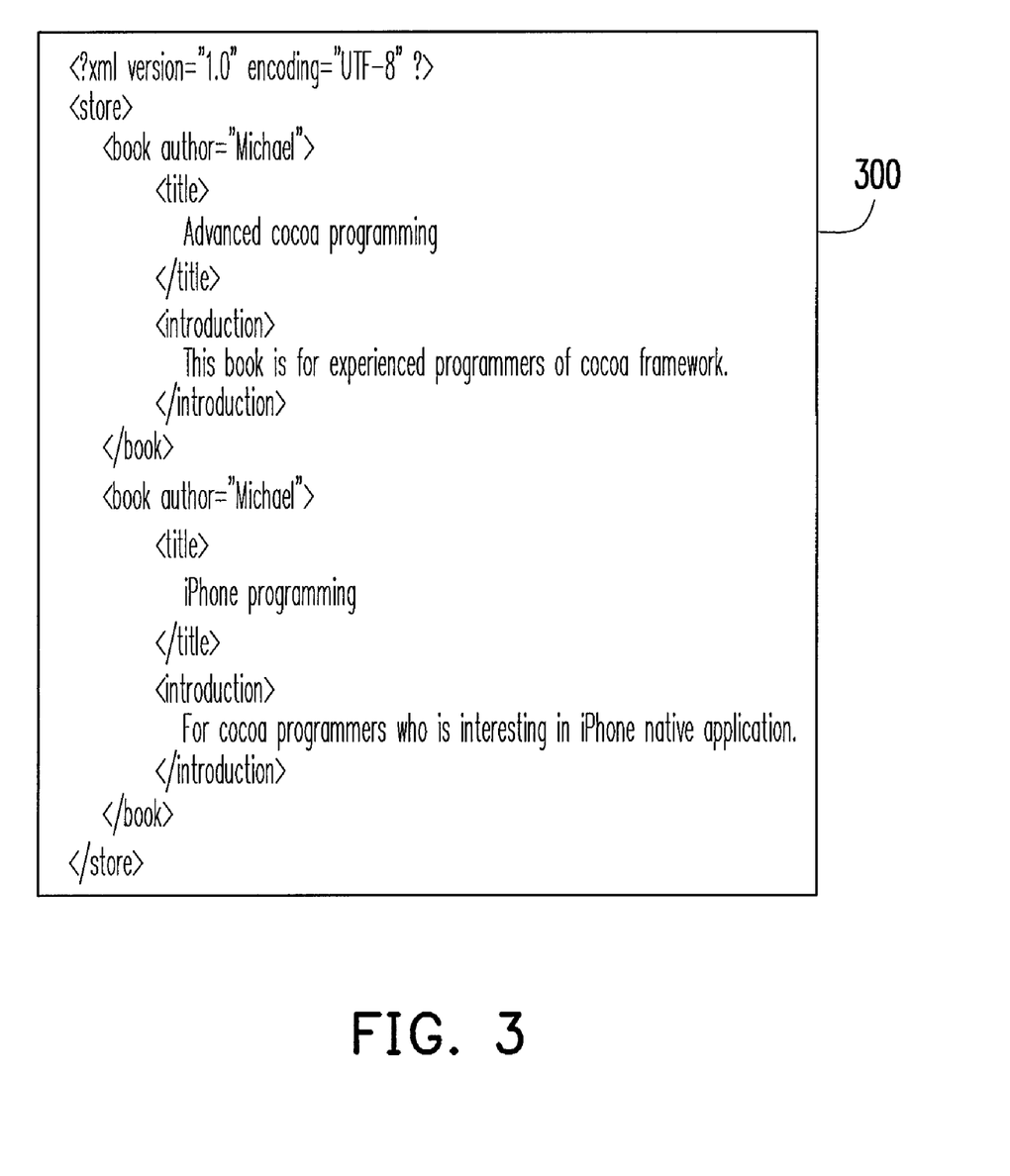
FIG. 3 is a diagram of a markup language document according to an embodiment of the present invention.

Below, the present invention will be described by taking a markup language document as an example. FIG. 3 is a diagram of a markup language document according to an embodiment of the present invention. Referring to FIG. 3, the markup language document 300 includes a root element "store". Besides, there are two elements "book" under the root element, and there are an element "title" and an element "introduction" under each element "book".

Taking the first element "store" as an example, the string length of the element "store" is 5. Because the element "store" is a root element, the hierarchy depth thereof is 1. Because the element "store" is at the first level therefore it has no parent element and the parent element index thereof is −1. Besides, in the markup language document 300, the start position of the element "store" is 40 if counted from the first word in the first row, namely, the absolute position of the word "s" in the element "store" in the markup language document 300 is 40. In addition, assuming that the codes of the words in the element "store" are respectively 0073, 0074, 006F, 0072, and 0065, these codes are added up to obtain a pre-hashed value, and the pre-hashed value is then brought into a hash function to obtain a hashed value of the element "store".

Further, the offset field 260 can store a relative position from the absolute position of the first element in the intermediate table. For example, in FIG. 3, the absolute position of the first element <store> is stored in other place and the offset field of <store> is 0. Following the rule the offset value of <book> is 1 which means <book> is in the next index of <store> in the intermediate table, such that all the absolute position in the intermediate table isn't stored to save the memory space since the memory size of absolute position is bigger one of the relative position. The absolute position of the first element is only stored in some other place but not in the intermediate table.

Finally, in step S115, access to the markup language document is assisted according to the intermediate table. To be specific, regarding the XML path language, first, a location path is provided, wherein the location path contains a plurality of items. The location path is assumed to be /A/B/C, wherein items A, B, and C respectively represent an element in the markup language document. Next, the elements corresponding to all the items in the location path are sequentially queried from the item at the lowest level in the location path by using the parent element indexes of the elements stored in the intermediate table.

To be specific, first, an element corresponding to the item at the lowest level in the location path is first queried in the markup language document. Taking the location path /A/B/C as an example, the element C corresponding to C is queried in the markup language document. Then, the parent element index of the element C is queried according to the intermediate table to obtain the parent element of the element C. After that, the string corresponding to the parent element is obtained from the markup language document according to the offset field and the length field of the parent element. Next, whether the string corresponding to the parent element matches B is determined, and if so, the item at a next level in the location path is queried. Accordingly, all the items are sequentially queried from the lowest level upwards until the item A at the top level in the location path is queried.

For example, regarding the markup language document 300 in FIG. 3, the location path is assumed to be /store/book/title/text( )=iPhone programming. First, the absolute position of the string "iPhone programming" in the markup language document 300 is queried. Then, the corresponding record row in the intermediate table is found according to the absolute position of this string. Next, the parent element index of this string is obtained from the parent element field of the record row (i.e., the index of "title"), so as to obtain the parent element of this string. Thereafter, the parent element "book" of the element "title" is obtained in the intermediate table, and after that, the parent element "store" of the element "book" is further obtained in the intermediate table.

In addition, the elements "store" and "title" may collide with each other if the hierarchy depths thereof are not considered. In this case, the desired element can be obtained according to the hashed value thereof.

It should be mentioned that when an element in a markup language document is a ciphered element, a deciphered element obtained by deciphering the ciphered element can be transformed into the intermediate table and inserted right after the original record row. For example, an identification row is inserted for indicating that the record row right after the identification row is the deciphered element.

Namely, after deciphering the ciphered element to generate the deciphered element, an identification row is inserted into the intermediate table, wherein the identification row is located right after the record row corresponding to the ciphered element, so as to store the record row corresponding to the deciphered element right after the identification row. The identification row includes a special symbol field and a ciphered element index field, wherein the special symbol field indicates that the data recorded after the identification row is a deciphered element, and the ciphered element index field records the position of the ciphered element in the intermediate table.

Figure 4A:
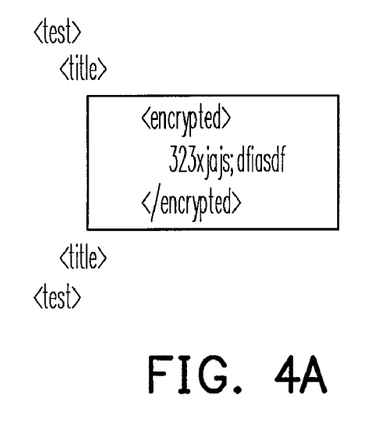
FIGS. 4A~4C are diagrams illustrating how a ciphered element is deciphered according to an embodiment of the present invention.
Figure 4B:
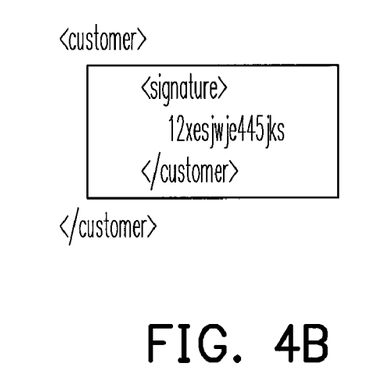
Figure 4C:
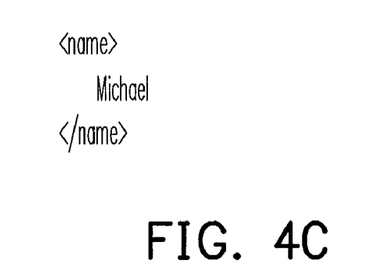
Figure 5:
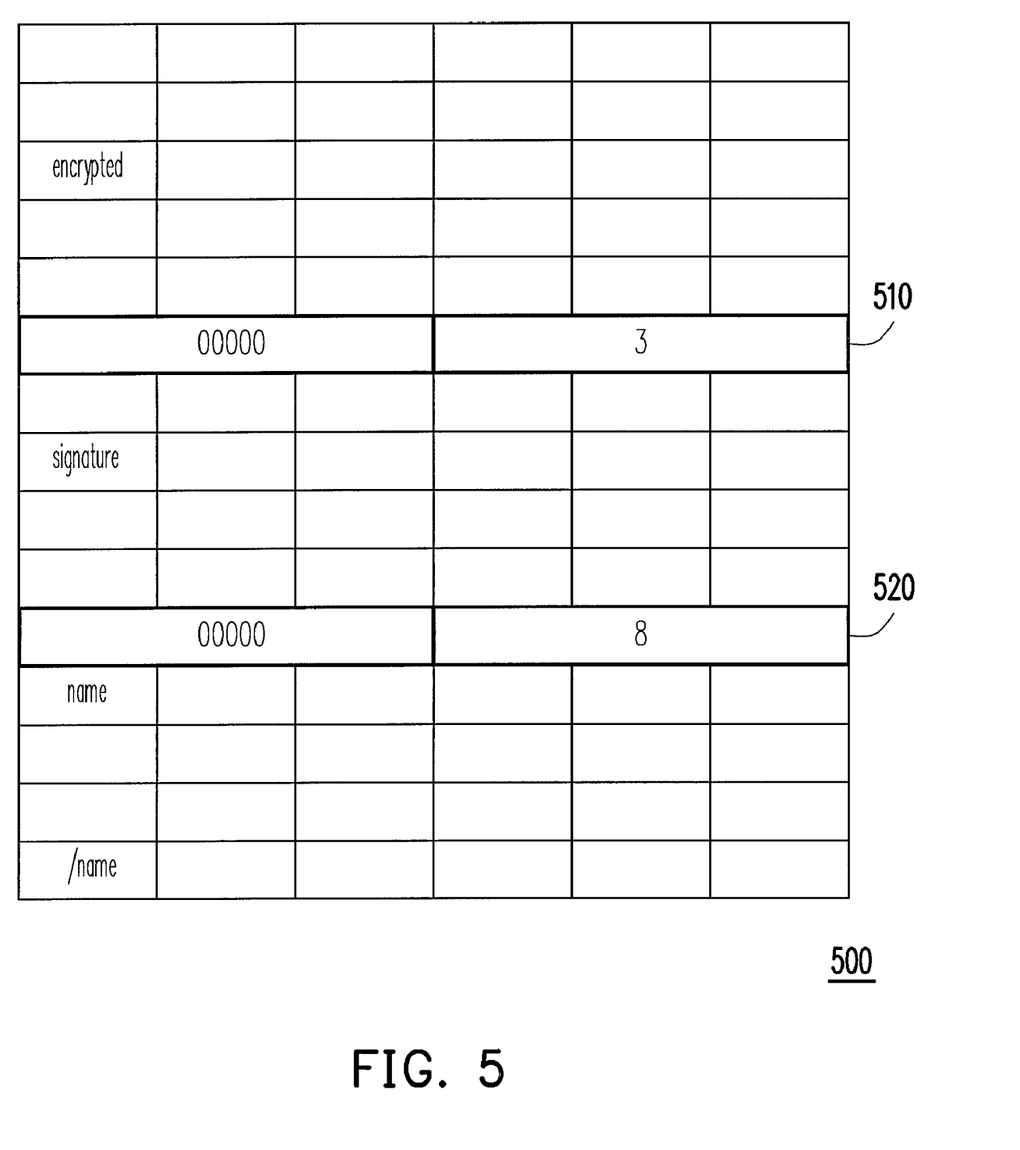
FIG. 5 is a diagram of an intermediate table after a ciphered element is deciphered according to an embodiment of the present invention.

FIGS. 4A~4C are diagrams illustrating how a ciphered element is deciphered according to an embodiment of the present invention. FIG. 4A illustrates the markup language document with a ciphered element, and the content illustrated in FIG. 4C is obtained by deciphering the content illustrated in FIG. 4A twice. Namely, FIG. 4B illustrates the deciphered result of the content in FIG. 4A, and FIG. 4C illustrates the deciphered result of the content in FIG. 4B. The record rows of the contents in FIGS. 4A~4C in an intermediate table are as illustrated in FIG. 5. FIG. 5 is a diagram of an intermediate table after a ciphered element is deciphered according to an embodiment of the present invention.

Referring to FIGS. 4A~4C and FIG. 5, in the present embodiment, the ciphered element "encrypted" is deciphered to generate a new element "signature". An identification row 510 is then inserted into the intermediate table 500, wherein the left field of the identification row 510 is the special symbol field, and "0000" is a predetermined value and which indicates that the record row after the identification row 510 is the structure data of the deciphered element. In addition, the right field in the identification row 510 is the ciphered element index field, and which records that the element "signature" is obtained by deciphering the ciphered element "encrypted" in the third row. Accordingly, when the element "signature" is deciphered to generate the element "name", an identification row 520 is also inserted into the intermediate table 500 to indicate that the record row after the identification row 520 records the structure data of the element "name".

Figure 6:
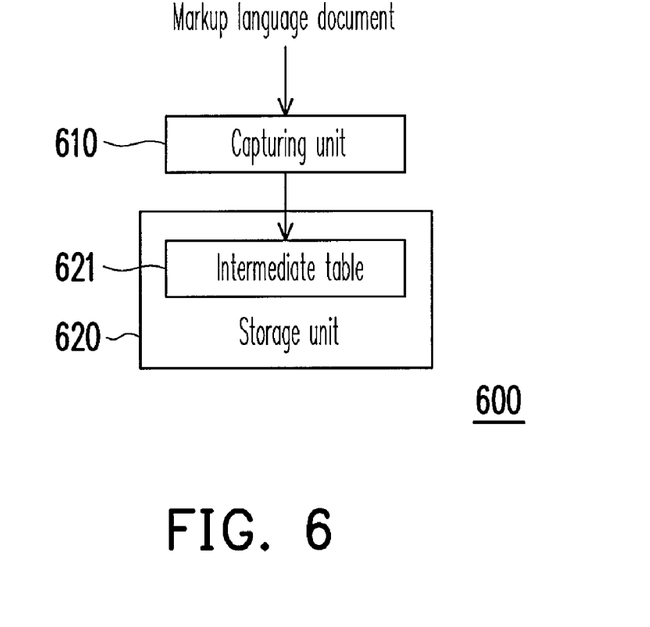
FIG. 6 is a block diagram of an assisting apparatus for accessing a markup language document according to an embodiment of the present invention.

An assisting apparatus using the method described above for accessing a markup language document will be described below with reference to an embodiment of the present invention. FIG. 6 is a block diagram of an assisting apparatus for accessing a markup language document according to an embodiment of the present invention. Referring to FIG. 6, in the present embodiment, the assisting apparatus 600 includes a capturing unit 610 and a storage unit 620. The storage unit 620 includes an intermediate table 621, and the intermediate table 621 is similar to the intermediate table 200 illustrated in FIG. 2 therefore will not be described herein.

The capturing unit 610 captures the structure data (including a string length, a hierarchy depth, an element type, a parent element index, and an absolute position) of each element from the markup language document and stores the structure data into the intermediate table 621 as binary data. Namely, the capturing unit 610 reads the markup language document and transforms the structure data of each element into the intermediate table 621. The detailed procedure for the capturing unit 610 to transform the structure data has been described above therefore will not be described herein.

Figure 7:
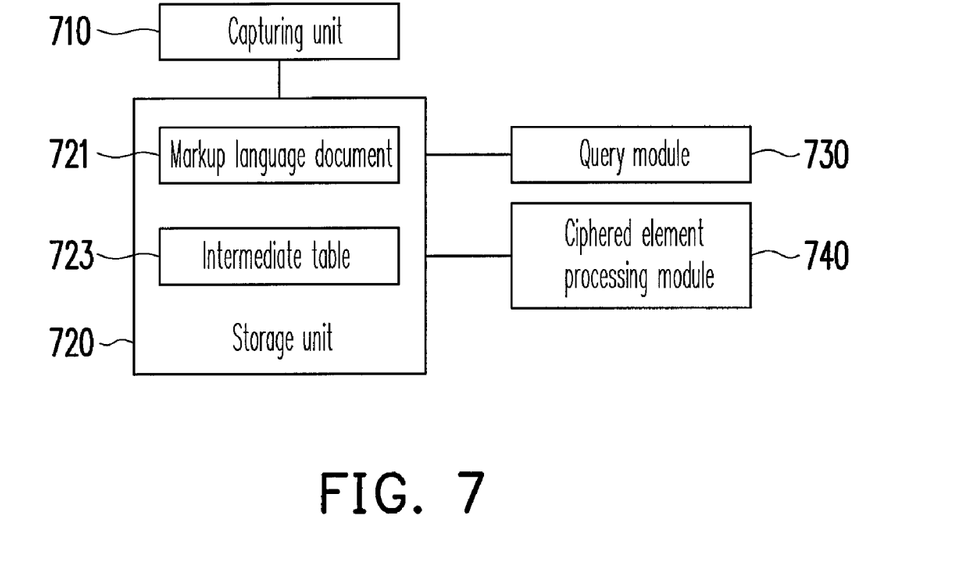
FIG. 7 is a block diagram of an assisting apparatus for accessing a markup language document according to another embodiment of the present invention.

FIG. 7 is a block diagram of an assisting apparatus for accessing a markup language document according to another embodiment of the present invention. Referring to FIG. 7, the assisting apparatus 700 includes a capturing unit 710, a storage unit 720, a query module 730, and a ciphered element processing module 740. The markup language document 721 and the intermediate table 723 are both located in the storage unit 720. The capturing unit 710 and the intermediate table 723 are respectively the same as the capturing unit 610 and the intermediate table 621 in the assisting apparatus 600.

In the present embodiment, the query module 730 queries the element corresponding to the item at the lowest level in the location path from the markup language document 721 and queries the parent element of the element by using the parent element index stored in the intermediate table 723, and then the query module 730 determines whether the parent element is corresponding to the item at a next level in the location path, wherein if the parent element is corresponding to the item at the next level in the location path, the query module 730 continuously queries the items in the location path until the item at the top level in the location path is queried.

When an element in the markup language document 721 is a ciphered element, the ciphered element processing module 740 deciphers the ciphered element to generate a deciphered element. After that, the ciphered element processing module 740 inserts an identification row into the intermediate table 723 for indicating the deciphered element. The identification row has been described above therefore will not be described again.

As described above, in the present invention, a markup language document is transformed into an intermediate table so that access to the markup language document can be assisted by using the intermediate table. Moreover, the parent element of each element in the markup language document is stored in the intermediate table so that the hierarchical tree structure of the entire markup language document can be completely stored in the intermediate table. Furthermore, a hashed value of each element is stored into the intermediate table so that most elements can be filtered out when multiple elements are queried. Accordingly, the efficiency of accessing the markup language document is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An assisting method for accessing a markup language document, wherein the markup language document comprises a plurality of elements, the assisting method comprising:

establishing an intermediate table in a storage unit, wherein the intermediate table comprises a length field, a depth field, a type field, a parent element field, and an offset field;

transforming a structure data of each of the elements into the intermediate table to respectively store a string length, a hierarchy depth, an element type, a parent element index, and an absolute position of the element into the length field, the depth field, the type field, the parent element field, and the offset field; and accessing the markup language document according to the intermediate table, wherein the step of accessing the markup language document according to the intermediate table comprises:

providing a location path, wherein the location path comprises a plurality of items; and sequentially querying the elements corresponding to all the items in the location path from the item at a lowest level in the location path by using the parent element indexes of the elements in the intermediate table, wherein the step of sequentially querying the elements corresponding to all the items in the location path from the item at a lowest level in the location path by using the parent element indexes of the elements in the intermediate table comprises:

querying an element corresponding to the item at the lowest level in the location path from the markup language document; and     querying a parent element of the element by using the parent element index of the element in the intermediate table, and determining whether the parent element is corresponding to an item at a next level in the location path, wherein if the parent element is corresponding to the item at the next level in the location path, the items in the location path are continuously queried by using the intermediate table until the item at a top level in the location path is queried.

2. The assisting method according to claim 1, wherein the step of transforming the structure data of each of the elements into the intermediate table comprises:

determining the string length of each of the elements to record the string length into the length field;

determining the hierarchy depth of each of the elements in the markup language document to record the hierarchy depth into the depth field;

determining the element type of each of the elements according to a type definition table to record the element type into the type field;

determining the parent element of each of the elements according to a hierarchical relationship between the elements to record the parent element index into the parent element field; and     determining the absolute position of each of the elements in the markup language document to record the absolute position into the offset field.

3. The assisting method according to claim 1, wherein the intermediate table further comprises a hash field, and the step of transforming the structure data of each of the elements into the intermediate table further comprises:

calculating a hashed value of each of the elements to record the hashed value into the hash field.

4. The assisting method according to claim 3, wherein the step of calculating the hashed value of each of the elements comprises:

adding up word codes of each of the elements to obtain a pre-hashed value; and     transforming the pre-hashed value into the hashed value through a hash function.

5. The assisting method according to claim 1, wherein the step of transforming the structure data of each of the elements into the intermediate table when one of the elements is the ciphered element further comprises:

inserting an identification row into the intermediate table after deciphering the ciphered element to generate a deciphered element.

6. The assisting method according to claim 5, wherein the identification row comprises a special symbol field and a ciphered element index field, wherein the special symbol field indicates that data recorded right after the identification row is the deciphered element, and the ciphered element index field records a position of the ciphered element in the intermediate table.

7. The assisting method according to claim 6, wherein the identification row is located right after the ciphered element.

8. The assisting method according to claim 1, wherein the step of transforming the structure data of each of the elements into the intermediate table comprises:

storing the structure data into the intermediate table as binary data.

9. An assisting apparatus for accessing a markup language document, wherein the markup language document comprises a plurality of elements, the assisting apparatus comprising:

a storage unit, for storing an intermediate table, wherein the intermediate table comprises a length field, a depth field, a type field, a parent element field, and an offset field;

a capturing unit, for capturing a string length, a hierarchy depth, an element type, a parent element index, and an absolute position of each of the elements in the markup language document and respectively storing the string length, the hierarchy depth, the element type, the parent element index, and the absolute position into the length field, the depth field, the type field, the parent element field, and the offset field; and     a query module, for sequentially querying the elements corresponding to a plurality of items in a location path from the item at a lowest level in the location path by using the parent element indexes of the elements in the intermediate table;

wherein the assisting apparatus assists an access to the markup language document according to the intermediate table through the query module, wherein the query module queries an element corresponding to the item at the lowest level in the location path from the markup language document; and queries a parent element of the element by using the parent element index of the element in the intermediate table, and determining whether the parent element is corresponding to an item at a next level in the location path, wherein if the parent element is corresponding to the item at the next level in the location path, the items in the location path are continuously queried by using the intermediate table until the item at a top level in the location path is queried.

10. The assisting apparatus according to claim 9, wherein the capturing unit comprises:

determining the string length of each of the elements to record the string length into the length field;

determining the hierarchy depth of each of the elements in the markup language document to record the hierarchy depth into the depth field;

determining the element type of each of the elements according to a type definition table to record the element type into the type field;

determining the parent element of each of the elements according to a hierarchical relationship between the elements to record the parent element index into the parent element field; and     determining the absolute position of each of the elements in the markup language document to record the absolute position into the offset field.

11. The assisting apparatus according to claim 9, wherein the intermediate table further comprises a hash field, and the capturing unit further calculates a hashed value of each of the elements to record the hashed value into the hash field.

12. The assisting apparatus according to claim 11, wherein the capturing unit adds up word codes of each of the elements to obtain a pre-hashed value and then transforms the pre-hashed value into the hashed value through a hash function.

13. The assisting apparatus according to claim 12 further comprising:
a ciphered element processing module, when one of the elements is a ciphered element, for deciphering the ciphered element to generate a deciphered element and inserting an identification row into the intermediate table.

14. The assisting apparatus according to claim 13, wherein the identification row comprises a special symbol field and a ciphered element index field, wherein the special symbol field indicates that data recorded right after the identification row is the deciphered element, and the ciphered element index field records a position of the ciphered element in the intermediate table.

15. The assisting apparatus according to claim 13, wherein the identification row is located right after the ciphered element.

16. The assisting apparatus according to claim 9, wherein the capturing unit stores the structure data into the intermediate table as binary data.

* * * * *